United States Patent
Morris

(10) Patent No.: US 9,314,981 B2
(45) Date of Patent: Apr. 19, 2016

(54) DIVIDED CONDUIT EXTRUSION DIE AND METHOD WITH JOINING FEATURES

(71) Applicant: Milliken & Company, Spartanburg, SC (US)

(72) Inventor: David Drew Morris, Newnan, GA (US)

(73) Assignee: Milliken & Company, Spartanburg, SC (US)

( * ) Notice: Subject to any disclaimer, the term of this patent is extended or adjusted under 35 U.S.C. 154(b) by 503 days.

(21) Appl. No.: 13/889,875

(22) Filed: May 8, 2013

(65) Prior Publication Data

US 2013/0300024 A1 Nov. 14, 2013

Related U.S. Application Data

(60) Provisional application No. 61/644,761, filed on May 9, 2012, provisional application No. 61/644,760, filed on May 9, 2012, provisional application No. 61/656,290, filed on Jun. 6, 2012, provisional application No. 61/730,526, filed on Nov. 28, 2012, provisional application No. 61/730,525, filed on Nov. 28, 2012.

(51) Int. Cl.
| | |
|---|---|
| *B29C 47/02* | (2006.01) |
| *B29D 23/00* | (2006.01) |
| *B29C 53/16* | (2006.01) |
| *B29C 47/12* | (2006.01) |
| *B29C 53/18* | (2006.01) |
| *B29C 53/54* | (2006.01) |
| *B29C 47/04* | (2006.01) |
| *B29C 47/00* | (2006.01) |

(Continued)

(52) U.S. Cl.
CPC .............. *B29D 23/00* (2013.01); *B29C 47/02* (2013.01); *B29C 47/028* (2013.01); *B29C 47/04* (2013.01); *B29C 47/12* (2013.01); *B29C 47/128* (2013.01); *B29C 53/16* (2013.01); *B29C 53/18* (2013.01); *B29C 53/54* (2013.01); *B29C 47/0028* (2013.01); *B29C 47/20* (2013.01); *B29C 47/28* (2013.01); *B29C 47/702* (2013.01); *B29C 47/705* (2013.01); *B29C 47/92* (2013.01); *B29C 2947/92704* (2013.01); *B29D 23/18* (2013.01); *B29D 24/00* (2013.01); *B29L 2023/00* (2013.01); *B29L 2023/005* (2013.01); *B29L 2024/006* (2013.01)

(58) Field of Classification Search
None
See application file for complete search history.

(56) References Cited

U.S. PATENT DOCUMENTS

| | | | |
|---|---|---|---|
| 2,401,550 A * | 6/1946 | Cook, Jr. ................. | B29C 47/02 264/171.21 |
| 3,110,754 A | 11/1963 | Witort et al. .................... | 174/70 |

(Continued)

OTHER PUBLICATIONS

Patent Cooperation Treaty PCT International Search Report. Date of Mailing, Sep. 4, 2013. International Application No. PCT/US2013/040124. International Filing Date, May 8, 2013.

(Continued)

*Primary Examiner* — Jeffrey Wollschlager
(74) *Attorney, Agent, or Firm* — Cheryl J. Brickey

(57) ABSTRACT

An apparatus and method are provided for making a conduit divided into channels by one or more strip-shaped substrates. The channels may be used for cables, such as fiber optic cables, coaxial cables, electrical cables, electrical wiring, and the like. Each divided conduit provides channels that allow e.g., cables to be pulled through without snagging or excessive heat build-up due to friction. In addition, the divided conduits do not allow contact or alternation losses between adjacent cables in other channels of the conduit.

10 Claims, 14 Drawing Sheets

(51) Int. Cl.
*B29D 23/18* (2006.01)
*B29D 24/00* (2006.01)
*B29C 47/70* (2006.01)
*B29L 24/00* (2006.01)
*B29L 23/00* (2006.01)
*B29C 47/20* (2006.01)
*B29C 47/28* (2006.01)
*B29C 47/92* (2006.01)

(56) References Cited

U.S. PATENT DOCUMENTS

| | | | | |
|---|---|---|---|---|
| 3,860,686 A * | 1/1975 | Myers | B29C 47/02 264/171.14 |
| 4,061,461 A | 12/1977 | Hessenthaler | 425/462 |
| 4,157,194 A * | 6/1979 | Takahashi | B29C 47/0023 138/109 |
| 4,374,596 A * | 2/1983 | Schlemmer | H02G 3/06 138/155 |
| 4,439,387 A * | 3/1984 | Hawley | B29C 47/027 264/108 |
| 4,568,507 A * | 2/1986 | Baxter | B29C 47/027 156/244.12 |
| 4,952,359 A * | 8/1990 | Wells | A61M 25/0009 264/139 |
| 4,967,800 A * | 11/1990 | Heilmayr | F16L 9/22 138/128 |
| 4,994,047 A * | 2/1991 | Walker | A61L 29/06 600/581 |
| 5,045,377 A * | 9/1991 | Amata | B29C 47/0014 264/136 |
| 5,055,104 A * | 10/1991 | Ray | A61B 17/1757 606/247 |
| 5,374,245 A * | 12/1994 | Mahurkar | A61M 25/001 604/43 |
| 5,587,115 A | 12/1996 | Allen | 264/1.24 |
| 5,667,818 A * | 9/1997 | Guillemette | B29C 47/0016 264/173.16 |
| 5,897,732 A * | 4/1999 | Schlameus | B29C 53/52 156/201 |
| 5,900,088 A * | 5/1999 | Yamagiwa | B29C 47/0028 156/115 |
| 5,996,639 A * | 12/1999 | Gans | B29C 49/0021 138/115 |
| 6,247,500 B1 * | 6/2001 | McMahon | F16L 9/22 138/157 |
| 6,262,371 B1 * | 7/2001 | Allen | H02G 1/08 138/116 |
| 6,304,698 B1 * | 10/2001 | Morris | G02B 6/4459 138/111 |
| 6,398,190 B1 * | 6/2002 | Li | G02B 6/4459 254/134.3 FT |
| 6,783,716 B2 * | 8/2004 | McCullough | B29C 47/20 264/171.13 |
| 7,163,388 B2 * | 1/2007 | Anand | B29C 47/20 425/131.1 |
| 7,214,880 B2 * | 5/2007 | Wiekhorst | H01B 7/0233 174/102 SP |
| 7,670,526 B2 * | 3/2010 | Solar | A61M 25/09 156/244.11 |
| 7,850,675 B2 * | 12/2010 | Bell | A61M 25/0045 604/523 |
| 7,972,465 B2 * | 7/2011 | Patterson | A61M 25/0012 156/244.15 |
| 8,007,700 B2 * | 8/2011 | Perez | H01B 3/16 174/110 FC |
| 8,809,682 B2 * | 8/2014 | Hepfinger | H02G 9/065 138/115 |
| 9,061,448 B2 * | 6/2015 | Hepfinger | B29C 47/0028 |
| 2003/0004493 A1 * | 1/2003 | Casey | A61M 25/005 604/525 |
| 2005/0139377 A1 * | 6/2005 | Levy | B29C 47/0004 174/110 R |
| 2007/0098940 A1 * | 5/2007 | Heffner | H01B 13/14 428/36.9 |
| 2007/0102183 A1 * | 5/2007 | Jotti | B29C 47/0019 174/68.1 |
| 2008/0097350 A1 * | 4/2008 | Bell | A61M 25/0023 604/266 |
| 2010/0327477 A1 * | 12/2010 | Sansoucy | A61M 25/0009 264/148 |
| 2011/0172644 A1 * | 7/2011 | Zanoni | A61L 29/18 604/529 |
| 2012/0261062 A1 * | 10/2012 | Hepfinger | B29C 47/0028 156/244.13 |
| 2012/0261157 A1 * | 10/2012 | Hepfinger | H02G 9/065 174/95 |

OTHER PUBLICATIONS

Patent Cooperation Treaty PCT International Search Report. Date of Mailing, Sep. 4, 2013. International Application No. PCT/US2013040121. International Filing Date, May 8, 2013.

* cited by examiner

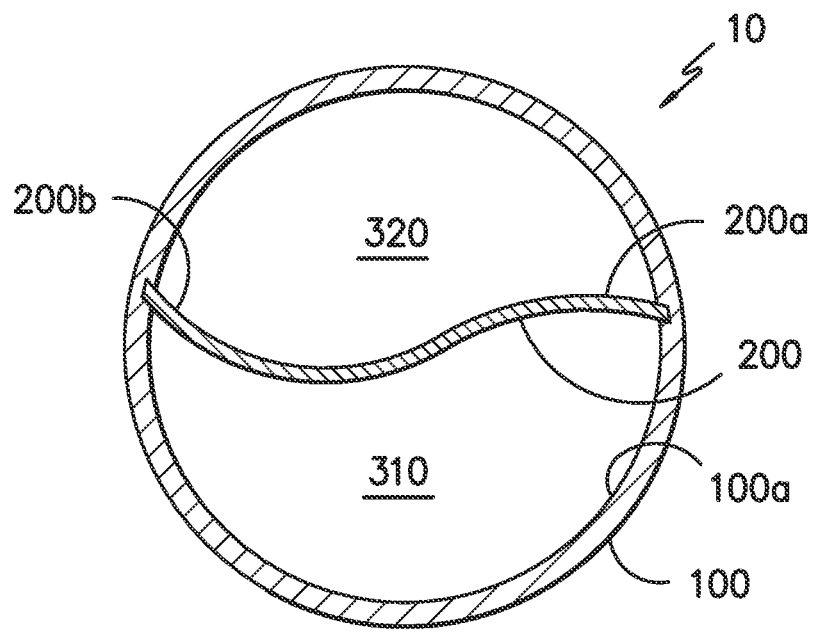
FIG. -1-
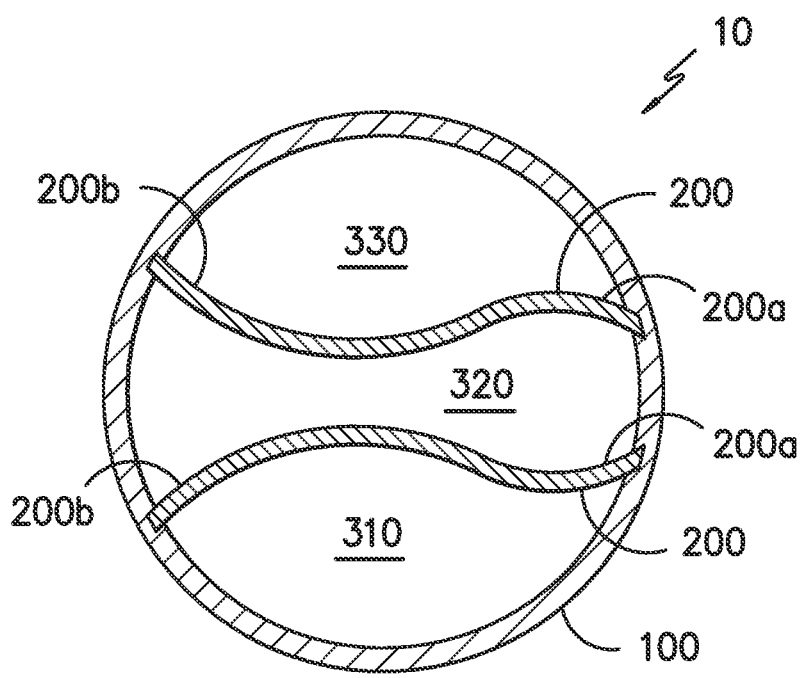
FIG. -2-

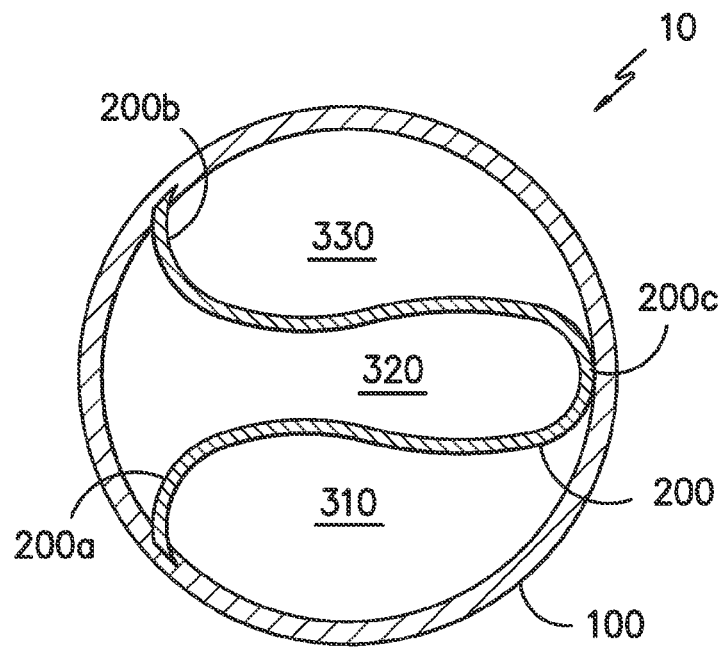
FIG. -3-
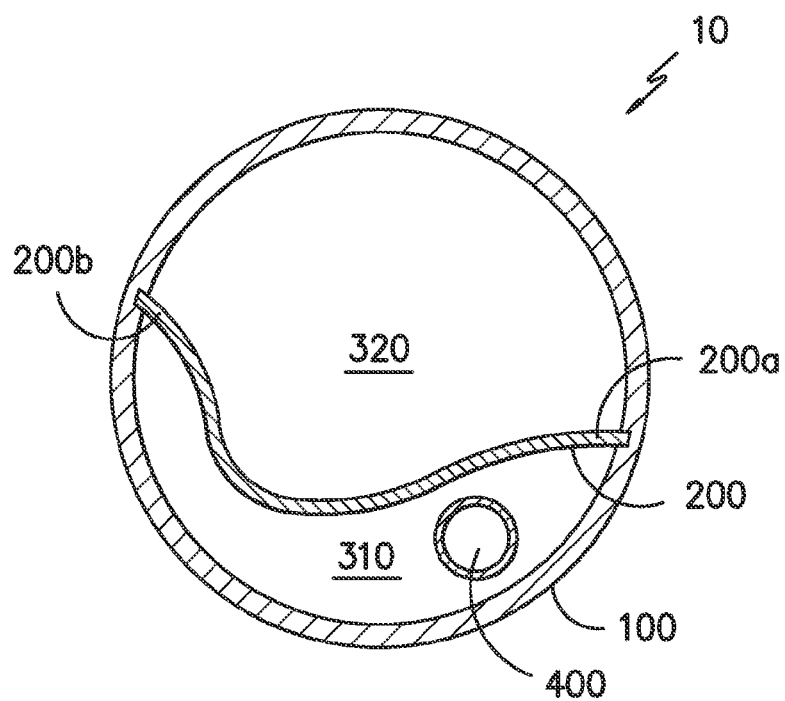
FIG. -4-

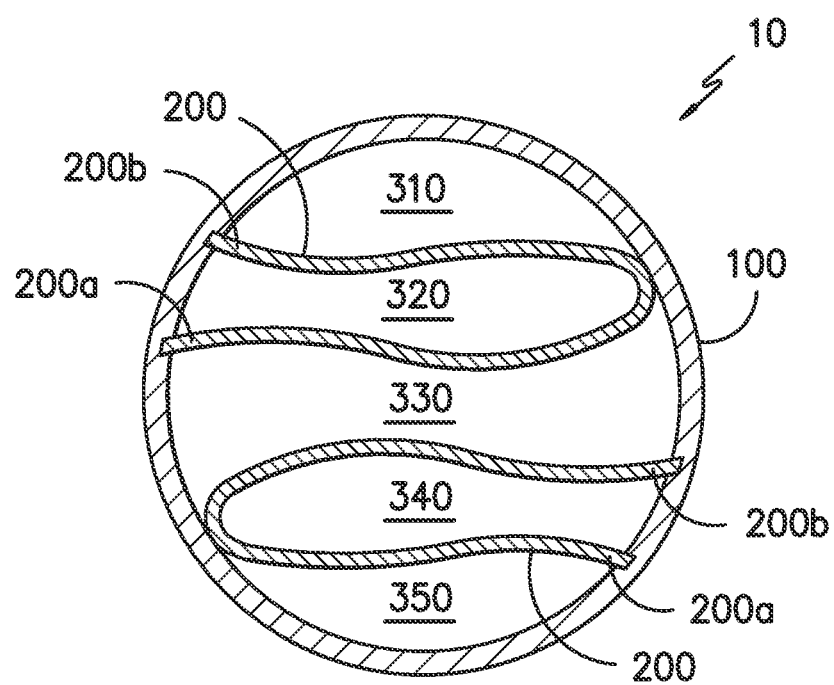
FIG. -5-

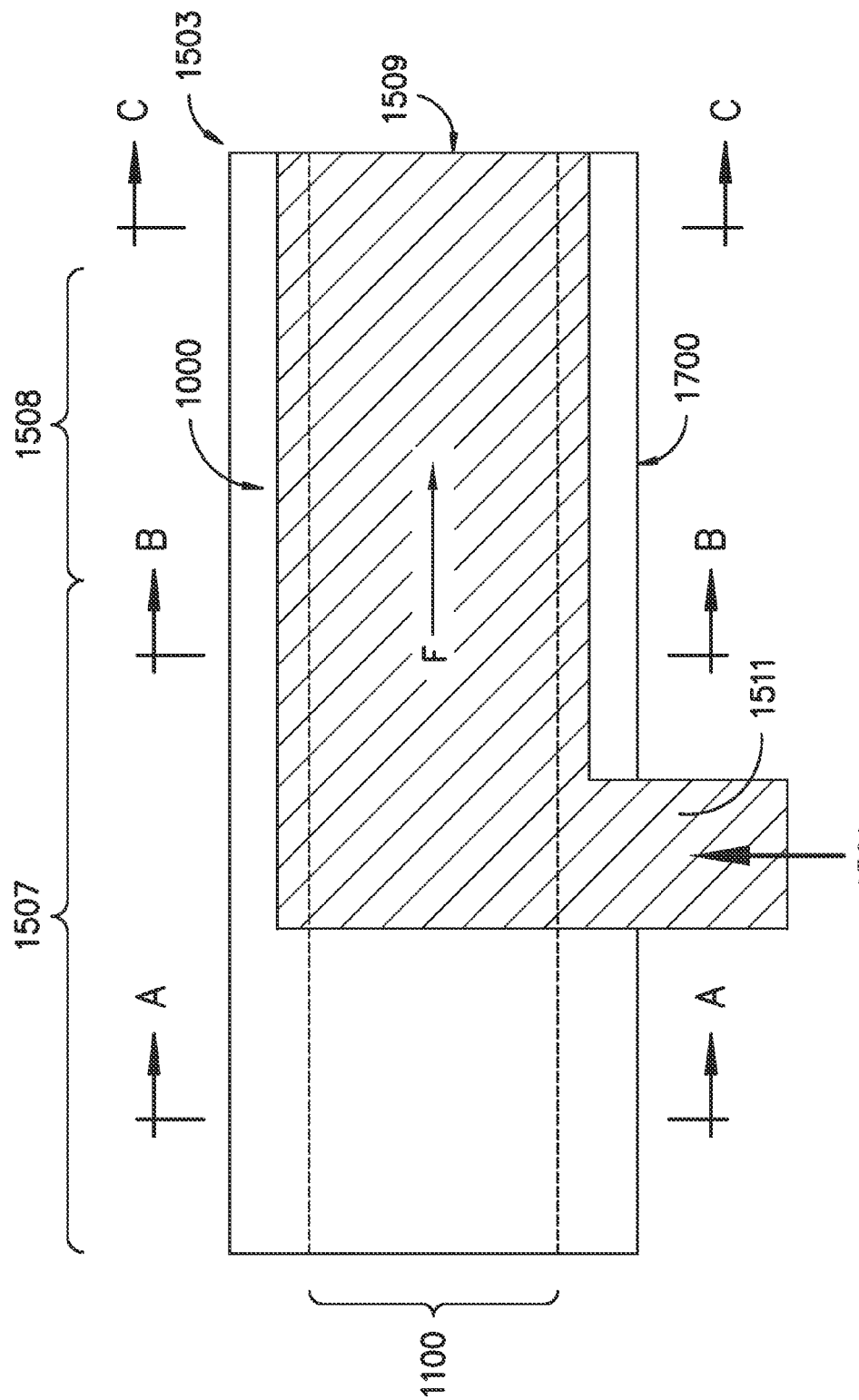
FIG. —6A—

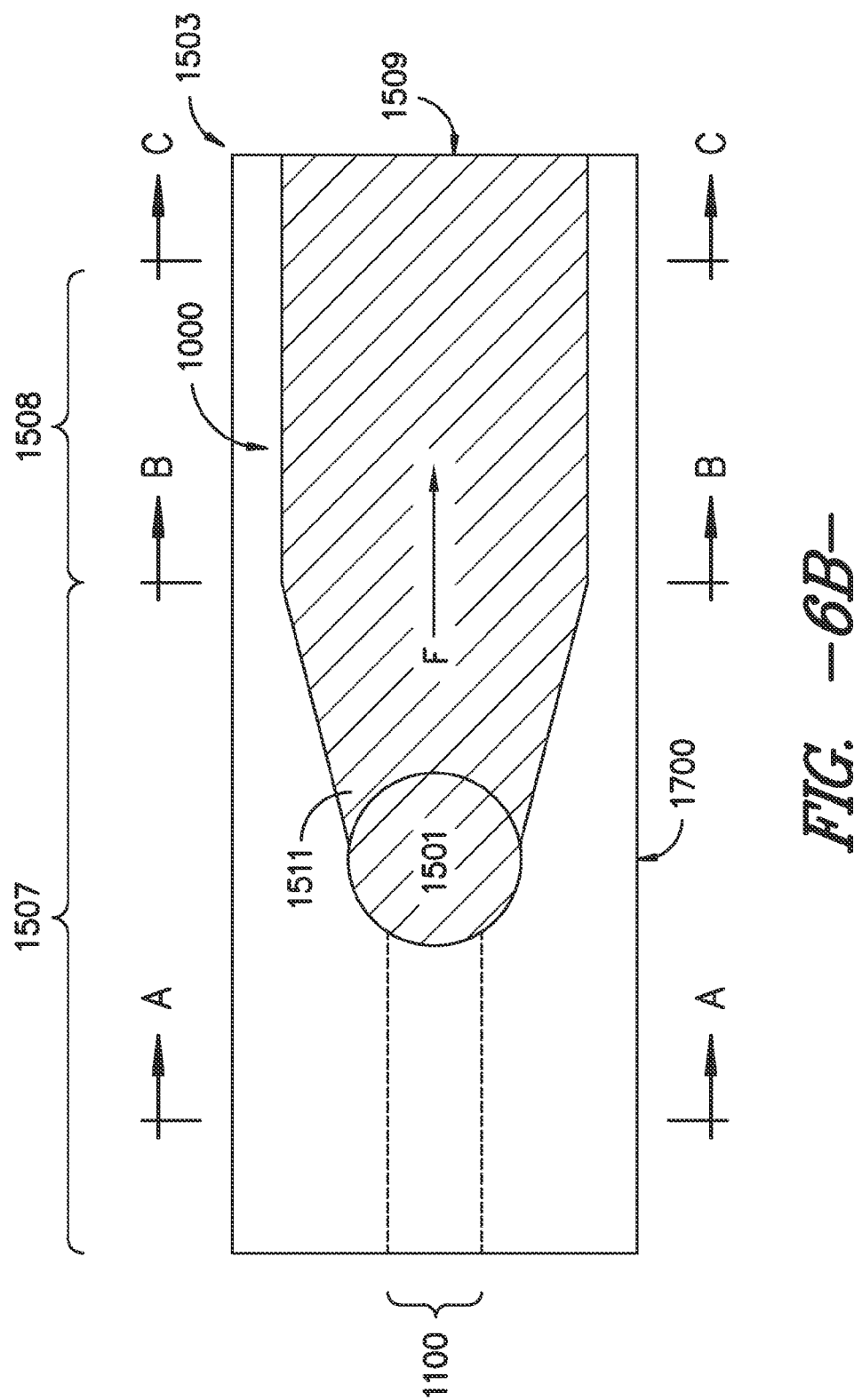
FIG. —6B—

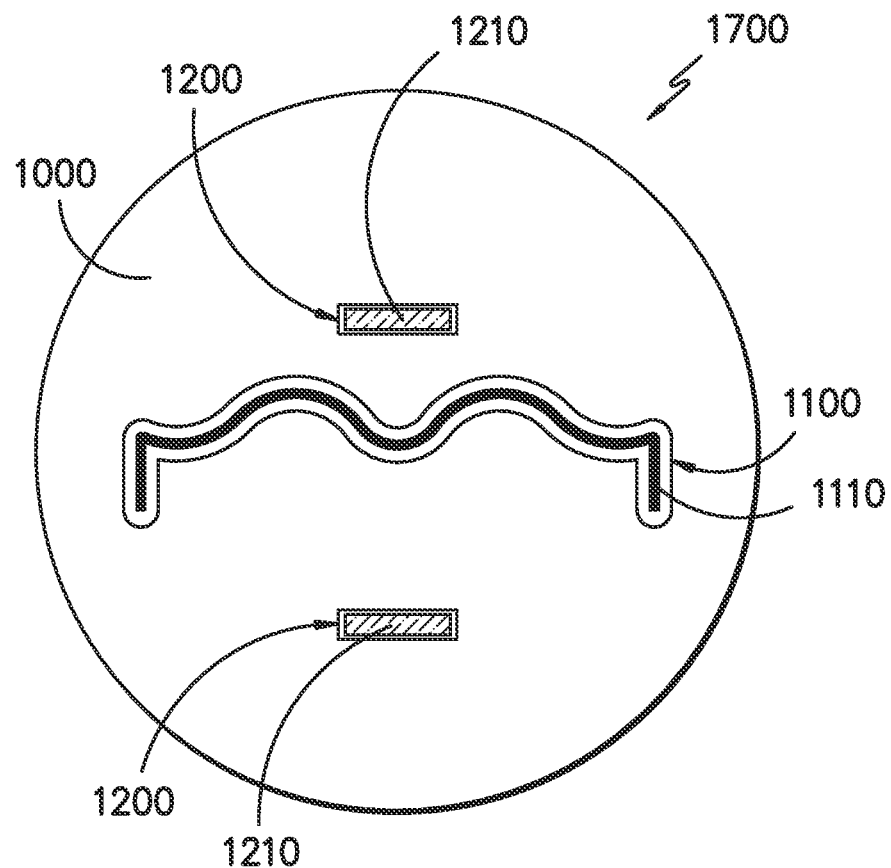
A—A
FIG. —7—

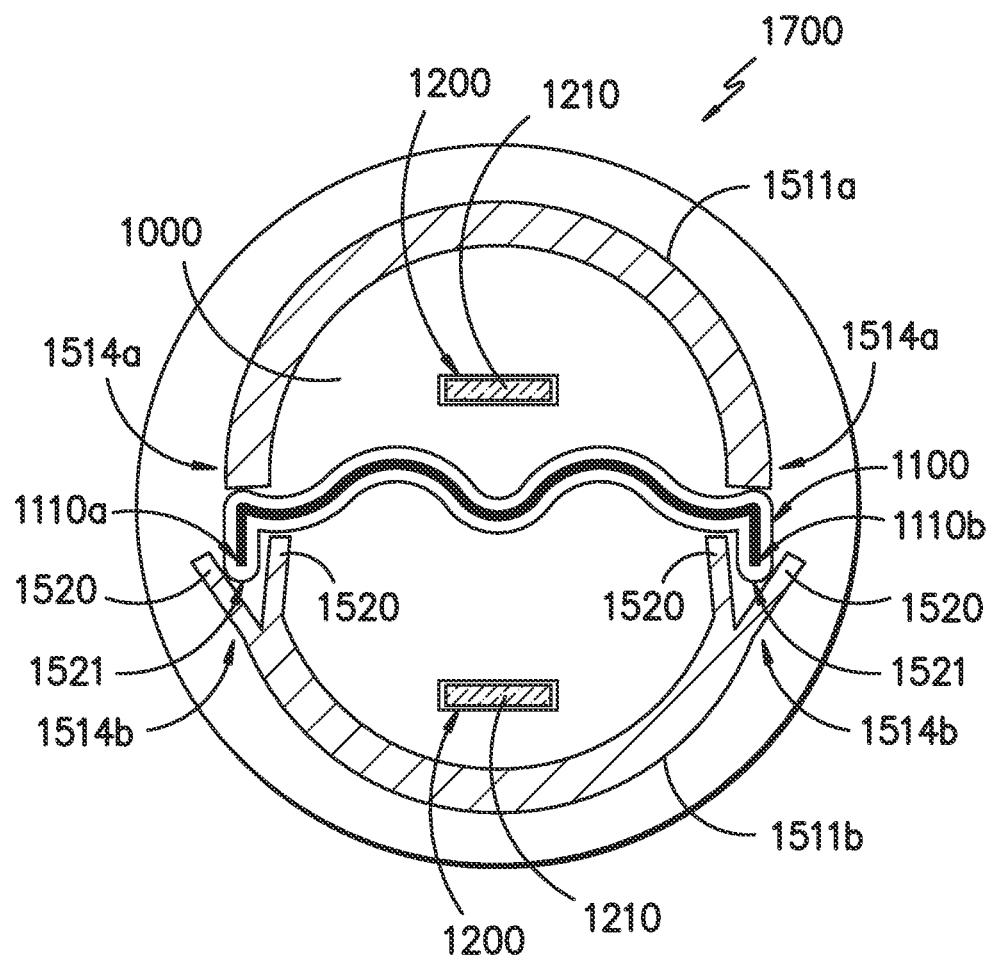
B-B
FIG. —8—

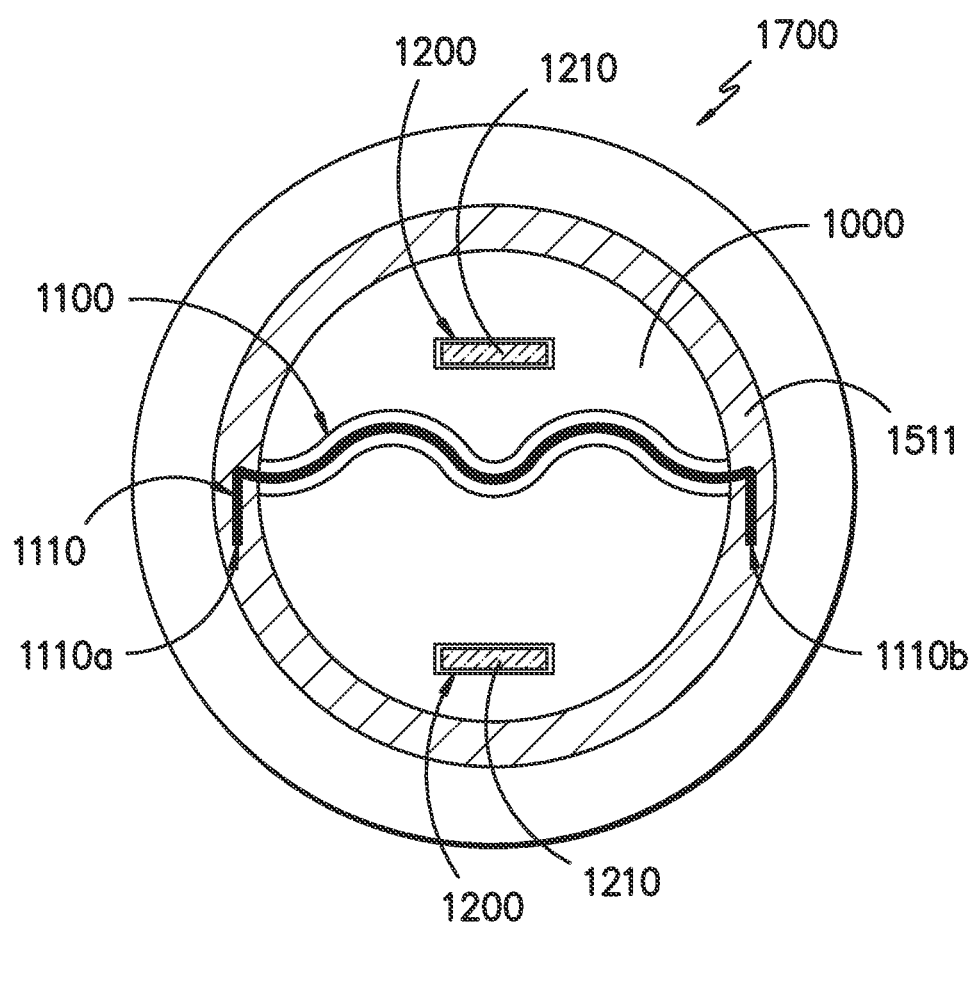
C-C
FIG. -9-

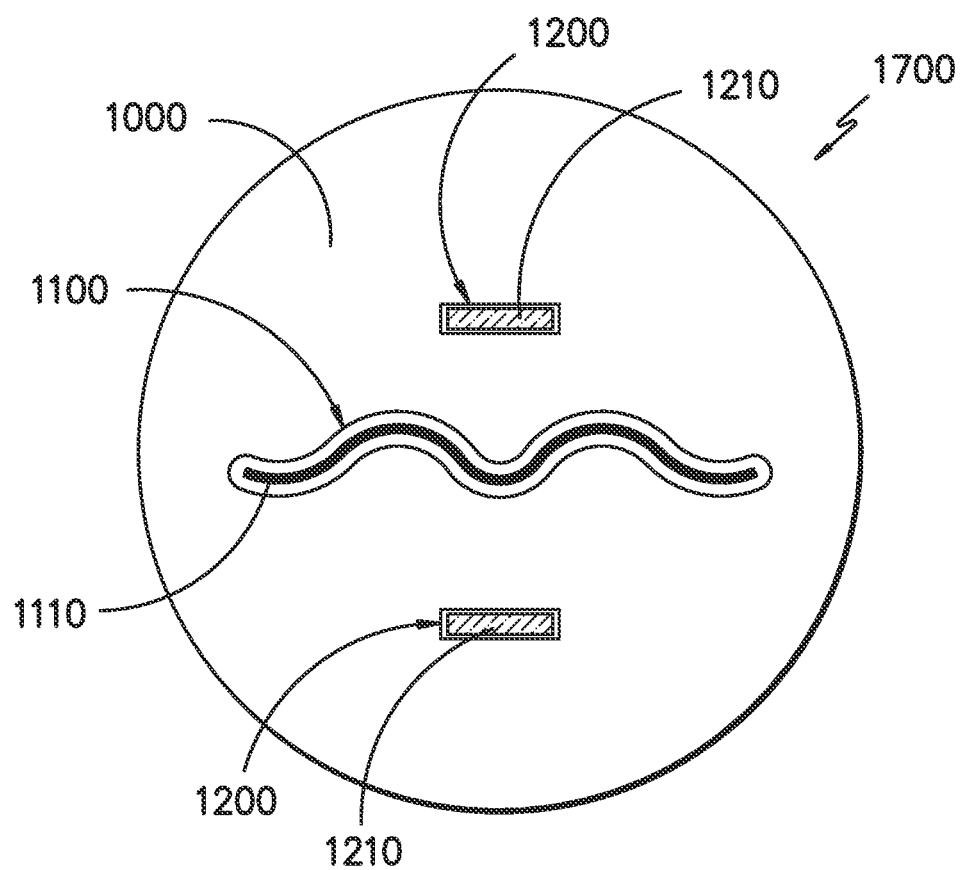
FIG. -10-

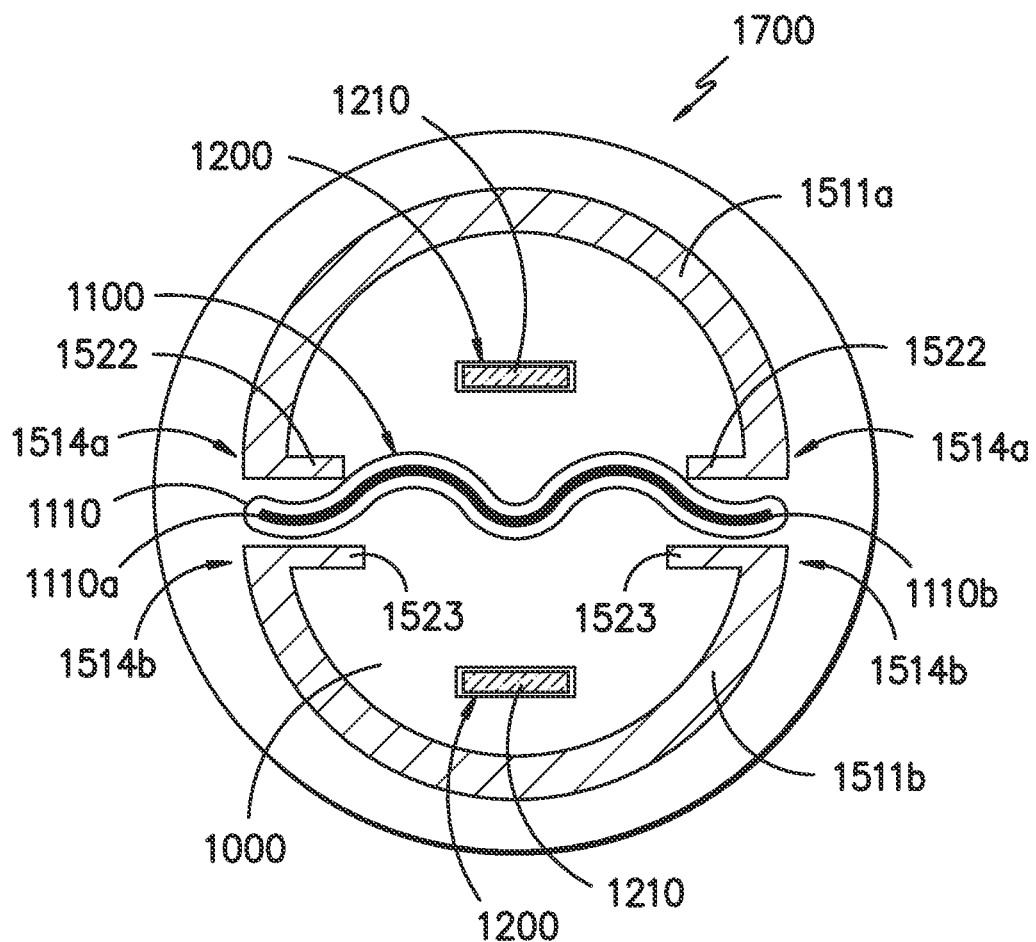
B-B
FIG. -11-

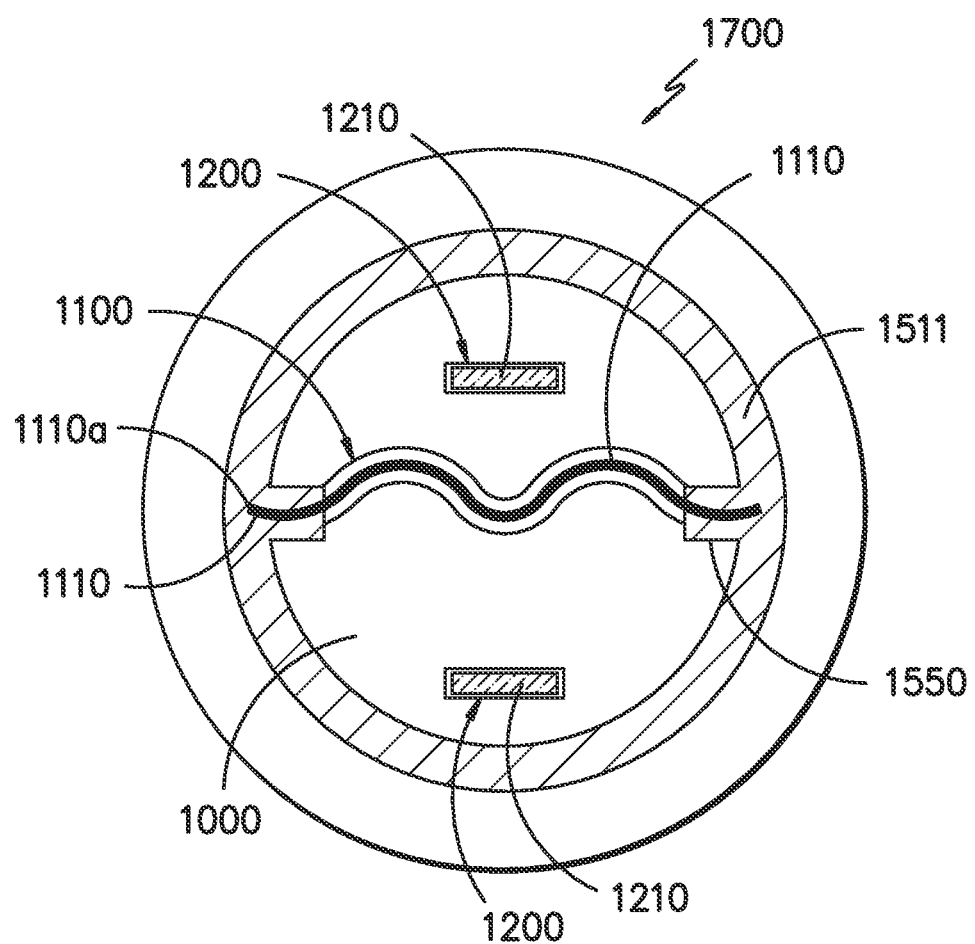
C-C
FIG. -12-

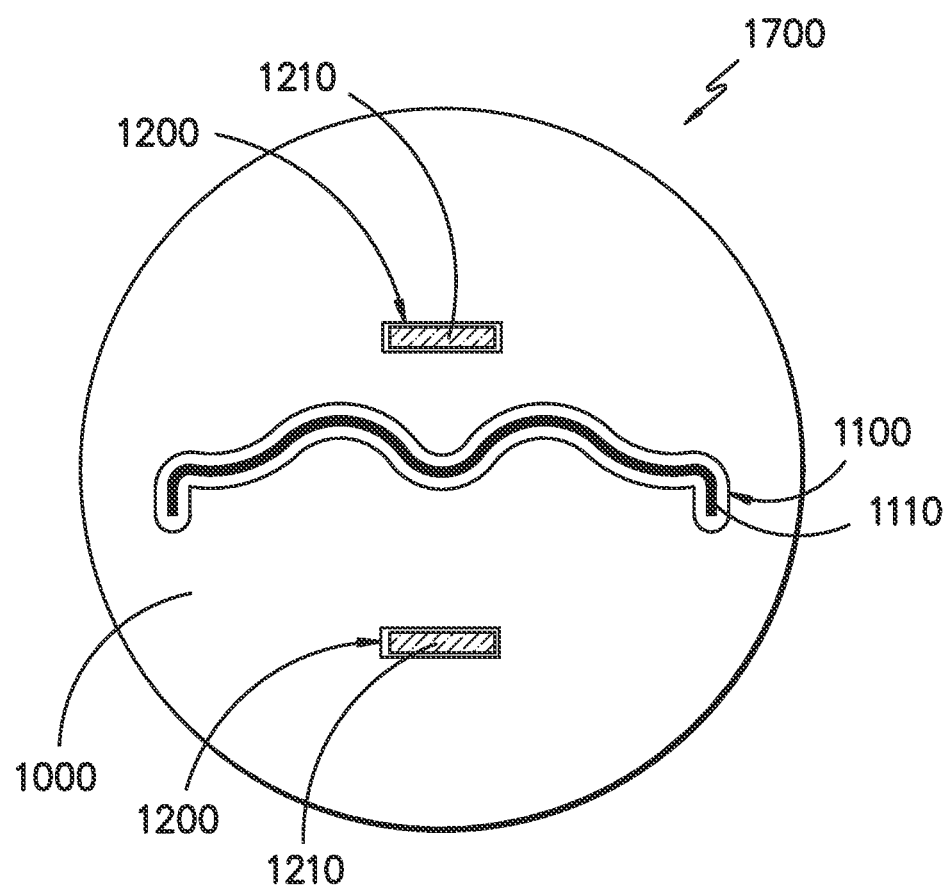
A-A
FIG. —13—

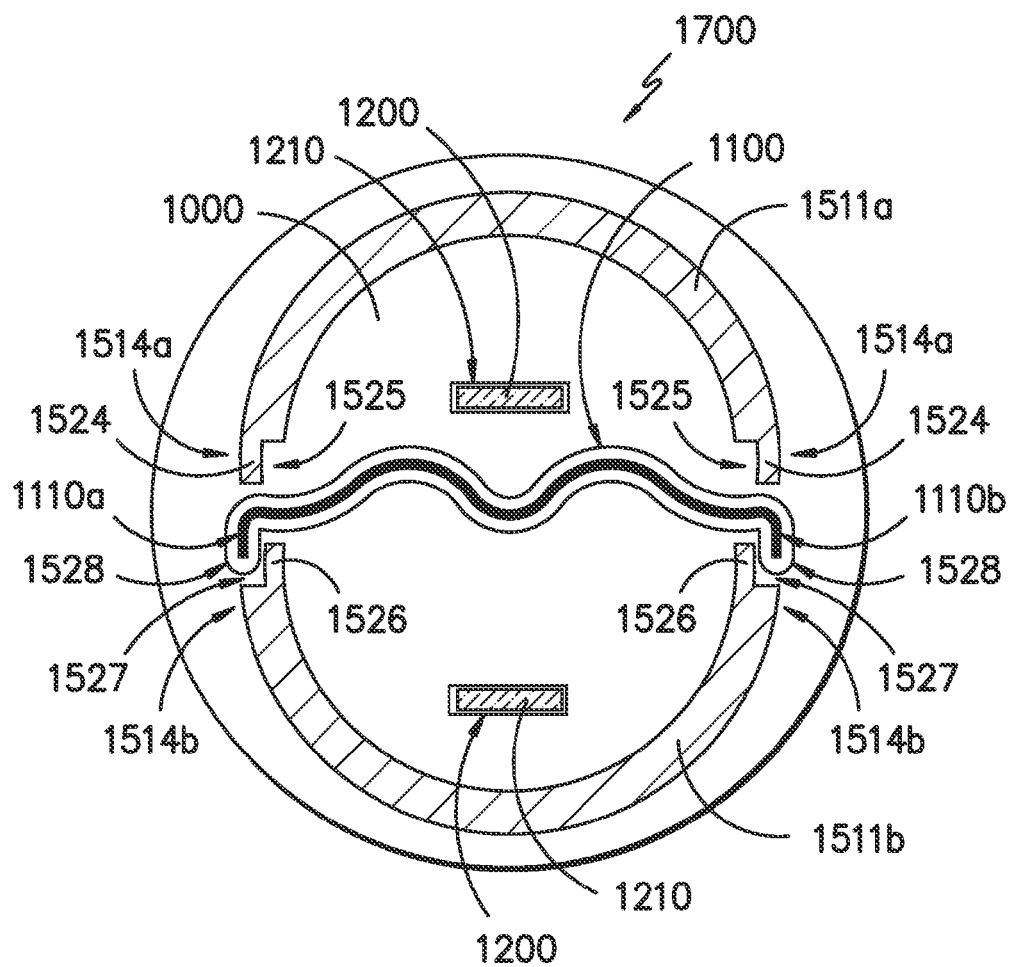
B-B
FIG. —14—

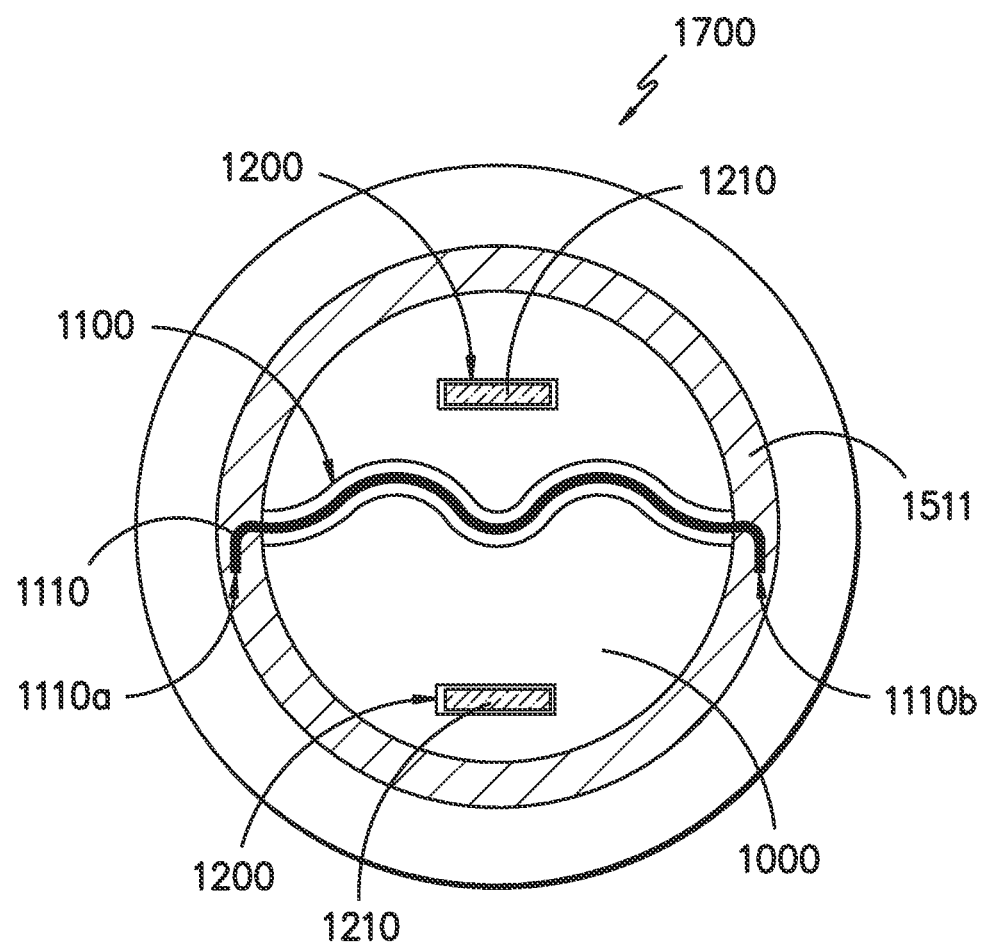
C-C
FIG. -15-

DIVIDED CONDUIT EXTRUSION DIE AND METHOD WITH JOINING FEATURES

PRIORITY CLAIM

This application claims priority to U.S. Provisional Patent Application No. 61/644,761 filed on May 9, 2012, U.S. Provisional Patent Application No. 61/644,760 filed on May 9, 2012, U.S. Provisional Patent Application No. 61/656,290 filed on Jun. 6, 2012, U.S. Provisional Patent Application No. 61/730,525 filed on Nov. 28, 2012, and U.S. Provisional Patent Application No. 61/730,526 filed on Nov. 28, 2012. The foregoing provisional patent applications are incorporated herein by reference for all purposes.

TECHNICAL FIELD

The subject matter of the present disclosure relates generally to an extrusion die and a method for creating divided conduits into which cables, such as fiber optic cables, coaxial cables, electrical cables, electrical wiring, and the like, may be positioned.

BACKGROUND

Cable, such as fiber optic communication cable, is often provided underground in great lengths, and may even extend for many miles. It is known in the art to bury the cable in the ground so that the area above-ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable during in-ground installations. The conduit, which is often formed from lengths of polyvinyl chloride tubing, polyethylene tubing or the like, is laid in the ground, after which a rope is placed in the conduit either by blowing or rodding. The rope, in turn, is attached to one of the communication cables. By pulling the rope from one end of the conduit, the cable is drawn through the conduit into position. Once placed within the conduit, the cable is protected from damage which may be caused by weather, water, and the like.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists, therefore, for a method of creating a conduit, such as an underground communication cable conduit, that has multiple sections or channels into which one or more cables may be installed. A need also exists for an apparatus that that facilitates the formation of such a divided conduit.

SUMMARY OF EMBODIMENTS OF THE INVENTION

The present invention provides an apparatus and method for making a conduit divided into channels by one or more strip-shaped substrates. The channels may be used for cables, such as fiber optic cables, coaxial cables, electrical cables, electrical wiring, and the like. Each divided conduit provides channels that allow e.g., cables to be pulled through without snagging or excessive heat build-up due to friction. In addition, the divided conduits do not allow contact or alternation losses between adjacent cables in other channels of the conduit. Additional objects and advantages of the invention will be set forth in part in the following description, or may be apparent from the description, or may be learned through practice of the invention.

In one exemplary embodiment, the present invention provides an apparatus for forming a conduit having at least one strip-shaped substrate dividing the conduit into channels. The apparatus includes an extrusion die defining a flow direction for a polymeric material forming the conduit. The extrusion die includes a first point for introduction into the extrusion die of the polymeric material forming the conduit; an exit for polymeric material to leave the extrusion die; and a slot configured for receipt of a strip-shaped substrate, the slot extending in the flow direction along the extrusion die. The extrusion die is configured to extrude the polymeric material into at least two opposing portions, each of the two opposing portions having a pair of distal edges. Along the flow direction the slot has an upstream section that is positioned outside of the distal edges and a downstream section that is positioned between the two opposing portions and adjacent to the distal edges.

In another exemplary aspect, the present invention provides a method of using an extrusion die and an extrusion pin to extrude conduit that is divided into channels by at least one strip-shaped substrate. The method includes the steps of introducing polymeric material into the extrusion die at a first point and causing the polymeric material to move along a flow direction of the extrusion die towards an exit of the extrusion die; forming the polymeric material into at least two opposing portions where each of the two opposing portions has a pair of distal edges; feeding the strip-shaped substrate through the extrusion die along the flow direction; and joining the two opposing portions along the pair of distal edges of each portion with the strip-shaped substrate embedded between the distal edges.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

An exemplary embodiment of the present invention will now be described by way of example, with reference to the accompanying figures, wherein:

FIG. 1 is an illustration of one exemplary embodiment of a divided conduit of the invention having one strip-shaped substrate forming two channels.

FIG. 2 is an illustration of one embodiment of the invention having two strip-shaped substrates forming three channels.

FIG. 3 is an illustration of one embodiment of the invention having one strip-shaped substrate forming three channels.

FIG. 4 is an illustration of one embodiment of the invention having one strip-shaped substrate forming two channels, where the strip-shaped substrate is moved towards the inner surface of the conduit.

FIG. 5 is an illustration of one embodiment of the invention having two strip-shaped substrates forming five channels.

FIGS. 6A and 6B illustrate an exemplary embodiment of an extrusion die system of the present invention.

FIGS. 7-9 illustrate different cross-sections of the extrusion die system of FIGS. 6A and 6B.

FIGS. 10-12 illustrate additional embodiments of the cross-sections of the extrusion die system of FIGS. 6A and 6B.

FIGS. 13-15 illustrate additional embodiments of the cross-sections of the extrusion die system of FIGS. 6A and 6B.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The term "strip-shaped substrate" refers to a long strip of flexible material made of any suitable material such a textile or film. The term "longitudinal edges" refers to the edges along the length of the strip-shaped substrate. The term "longitudinal axis" refers to the axis of the strip-shaped substrate along its length. "Integral", in this application, means that two of more materials are connected with each other without the further use of any glues or adhesives. The divided conduit may be considered to be integral.

Referring now to FIG. 1, there is shown one embodiment of the divided conduit 10. In FIG. 1, the conduit 100 contains one strip-shaped substrate 200. The strip-shaped substrate 200 has two longitudinal edges, a first longitudinal edge 200a and a second longitudinal edge 200b, both of which are adhered to the inner surface 100a of the conduit 100. This forms two channels 310 and 320 where cables or other elongated structures may be placed. The cables or other elongated structures may be placed into the channels during the formation of the divided conduit, after the conduit is formed, or after the conduit is installed. The divided conduit formed is flexible and a lower weight than some alternative technologies.

The conduit 10 (also sometimes referred to as a pipe or tube), may be any suitable conduit formed from an extrudable material such as a polymeric material or, more specifically, a thermoplastic. The conduit may have any suitable wall thickness, inner diameter, and outer diameter. Conduits for use in the fiber optic field tend to have an inner diameter of about 12 mm to 50 mm. In other embodiments, the conduit may have a very large inner diameter, for example from about 100 mm to 150 mm, or may have a very small diameter such as less than about 50 mm.

The conduit is preferably flexible. In one embodiment, the conduit is formed from a polymeric material including a polymer selected form the group consisting of polyethylene, polypropylene, polyester, and polyvinyl chloride. The conduit may contain a bumpy finish to reduce the amount of contact the film has with the cable, pull line, or other elongated structure. In one embodiment, the inner or outer surface of the conduit has a textured surface. One example of a textured surface is an "orange peel" finish, where the texture resembles the bumpy surface of the skin of an orange (fruit). This textured surface may serve to reduce the coefficient of friction and allow for easier insertion of cables or other elongated structures. The conduit may be smooth-wall, corrugated, or the like.

The strip-shaped substrate 200 may be formed of any suitable material. The strip-shaped substrate should be flexible, have a low coefficient of friction to avoid cable damage and preferably have a high strength to avoid tearing during cable installation. In one embodiment, the strip-shaped substrate 200 should be able to withstand the extrusion temperatures of the thermoplastic polymer used to form the conduit.

Preferably, the coefficient of friction for the strip-shaped substrate (dynamic or sliding coefficients of friction) is between about 0.06 to about 0.14, and a narrower range of about 0.08 to about 0.13, may also be used. In one embodiment, the breaking tensile strength of the present fabric is in the range of from about 45 kg/cm to about 70 kg/cm. In another embodiment, the elongation percentages of the strip-shaped substrate are between 2% and 5% at 22.5 kg of force and between 5% and 10% at 45.5. Kg of force. The strip-shaped substrate preferably has a thickness of about 0.025 inches to 0.100 inches. The strip-shaped substrate preferably has a breaking strength of about 200 lbs/cm to 600 lbs/cm. The strip-shaped substrate preferably has air permeability of 10 $cm^3/cm^2/s$ to 70 $cm^3/cm^2/s$. Preferably the strip-shaped substrate has a rigidity of between about 100 and 400 grams force as measured by ASTM D6827.

In one embodiment, the strip-shaped substrate 200 is a strip-shaped textile. The strip-shaped textile used may be any suitable textile, but is preferably one that is flexible, has a low coefficient of friction, and a high tensile strength. The textile may be a knit, woven, non-woven, or unidirectional. The strip-shaped textile may have additional functional chemistries such as low friction, fire resistance, adhesion, or color added. The chemistries may be added to the yarns during yarn formation or applied onto the yarns before or after textile formation. In one embodiment, the textile has a weight of about 2 to 20 ounces per yard and in another embodiment has a weight of about 10 to 12 ounces per yard. The space between the yarns within the textile will aid in breathability of the textile and the flexibility of the divided conduit. Further, having these shapes should allow for easier movement of the strip-shaped textile within the divided conduit to change the size of the channels and make it easier to install cables in the empty channels. In another embodiment, the fabric preferably has high elongation, high temperature resistance, low shrinkage, and low coefficient of friction.

In one embodiment, the strip-shaped textile is a woven textile. The fabric base may also be, for example, plain, satin, twill, basket-weave, poplin, jacquard, and crepe weave textiles. Preferably, the woven textile is a plain weave textile. It has been shown that a plain weave has good abrasion and wear characteristics. A twill weave has been shown to have good properties for compound curves so may also be preferred for some strip-shaped textiles. The end count in the warp direction is between 35 and 70 in one embodiment. In another embodiment the end count may be between 5 and 50, more preferably between about 15 and 30 epi. The denier of the warp yarns is between 350 and 1200 denier in one embodiment. In another embodiment, the denier of the warp yarns may be between about 120 and 330 d. In one embodiment, the textile is air permeable which increases the flexibility of the divided conduit and may allow for easier movement of the strip-shaped textile within the divided conduit to change the size of the channels and make it easier to install cables in the empty channels.

In another embodiment, the strip-shaped textile is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the strip-shaped textile is a multi-axial, such as a tri-axial fabric (knit, woven, or non-woven). In another embodiment, the strip-shaped textile is a bias fabric. In another embodiment, the strip-shaped textile is a non-woven. The term non-woven refers to structures incorporating a mass of yarns that are entangled and/or heat fused so as to provide a coordinated structure with a degree of internal coherency. Non-woven fabrics for use as the strip-shaped textile may be formed from many processes such as for example, meltspun processes, hydroentangeling processes, mechanically entangled processes, stitch-bonded and the like. In another embodiment, the strip-shaped textile is a unidirectional textile and may have overlapping yarns or may have gaps between the yarns.

The yarns making up the strip-shaped textile forming the strip-shaped substrate 200 may be any suitable yarn. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

Some suitable materials for the yarns include polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof.

In one embodiment, the yarns of the textile have a greater melting temperature than the thermoplastic polymer forming the conduit so they will not melt during the extrusion process forming the divided conduit. In another embodiment, the yarns do not have a melting temperature (such as yarns from a thermoset polymer or some natural fibers), but must be able to withstand the extrusion conditions of the conduit without significant loss in physical properties.

In one embodiment, the textile contains warp yarns and weft yarns which are monofilament. In another embodiment, the warp yarns are monofilament and the weft yarns are multi-filament. In another embodiment, the warp yarns are monofilament and the weft yarns are an alternating arrangement of monofilament and multifilament yarns. In another embodiment, the warp yarns and weft yarns are multi-filament. In another embodiment, the warp yarns are multi-filament. In another embodiment, the warp yarns are multifilament and the filling yarns are monofilament. The phrase "alternating arrangement" refers to a repeating pattern of monofilament to multifilament yarns. In one embodiment, the arrangement of monofilament to multifilament yarns is 1:1. Other ratios, such as 1:2, 1:3, 2:3, 3:4, or 3:5, for example, may also be employed, as product specifications dictate. For the embodiments containing monofilament yarns, the denier of the yarns is preferably between about 200 and 800 denier. For the embodiments containing multifilament yarns, the denier of the yarns is preferably between about 200 and 1,000 denier.

In one exemplary embodiment, the strip-shaped substrate may be constructed from a plurality of textile or fabric elements that have been sewn or woven together. For example, multiple, distinct fabric elements may be woven or sewn together so that the elements are all connected at a line extending along their length (i.e., longitudinally). Such a construction would create a strip-shaped substrate having multiple longitudinal edges that can be adhered to, or embedded in, the conduit. Other constructions created from multiple fabric elements may be used for the strip-shaped substrate as well.

The strip-shaped substrate 200 may also be a strip-shaped film. Preferably, this film is made of a thermoplastic polymer, but may also be made of any other suitable material including a thermoset. Some suitable thermoplastic polymers include, but are not limited to polypropylene, polyethylene, polyester, polyvinyl alcohol, blends thereof, and co-polymers thereof. Preferably, the film is formed from a thermoplastic selected from the group consisting of polyester, polyolefin, and polyamide. The strip-shaped film may have perforations or be continuous. Perforations will aid in breathability of the film and the flexibility of the divided conduit. Further, having perforations should allow for easier movement of the strip-shaped film within the divided conduit to change the size of the channels and make it easier to install cables in between empty channels. Further, the strip-shaped film may be fiber reinforced or not. A film containing fibers may increase the breaking strength of the film. In one embodiment, at least one of the surfaces of the strip-shaped film has a textured surface. One example of a textured surface is an "orange peel" finish. This textured surface may serve to reduce the coefficient of friction and allow for easier insertion of cables or other elongated structures.

In some embodiments, an already formed, free-standing strip-shaped film is inserted into the conduit during (or directly after) the extrusion of the pipe. In one embodiment, this strip-shaped film is oriented, meaning that after extrusion the film is further stretched in at least one axis. This orienting serves to increase the dimensional stability and strength of the film to be placed into the conduit. In one embodiment, the polymer that the film is made of has a higher melting temperature than the polymer used to form the conduit. In another embodiment, the film does not have a melting temperature (such as thermoset polymer). In this embodiment, the film must be able to withstand the extrusion conditions of the conduit without significant loss in physical properties. During the manufacturing processes, the already formed, free-standing strip-shaped film is introduced into the conduit during or directly after extrusion of the conduit and the film must not lose significant physical properties during this process. The strip-shaped film may have chemistries added to the polymer before film formation or applied onto the formed film to provide for low friction, fire resistance, adhesion, or color. The film may contain a bumpy finish to reduce the amount of contact the film has with the cable, pull line, or other elongated structure.

While in FIG. 1 there is shown the strip-shaped substrate 200 adhered to the inner wall of the conduit 100 on both the first longitudinal edge 200a and the second longitudinal edge 200b, there may be embodiments where only one edge of the strip-shaped substrate is adhered to the inner wall of the conduit 100.

In one embodiment, the longitudinal edge(s) (200a, 200b) of the strip-shaped substrate 200 are embedded into the inner surface of a layer of polymeric material of the conduit. Being "embedded" means that the edges of the strip-shaped substrate are not just adhered to the inner surface but actually reside within the polymeric material forming the wall of the conduit such that the edge is completely covered, surrounded, and entrenched by the material of the conduit.

In one embodiment, the width of the strip-shaped substrate 200, defined as the distance between the first longitudinal edge 200a and the second longitudinal edge 200b is between about 32 and 60% of the inner circumference of the conduit. In another embodiment, the width of the strip-shaped substrate 200 is greater than the diameter of the conduit. For example, in FIG. 4, there is shown another embodiment of the divided conduit a longer width of the strip-shaped substrate (or film) is beneficial as it may move towards the inner surface of the conduit into one of the chambers of the divided conduit thus opening the other (unfilled) channel for less friction and easier cable installation.

FIG. 2 illustrates an additional embodiment of the invention where the divided conduit 10 contains a conduit 100 with two strip-shaped substrates 200, each strip-shaped substrates 200 having a first longitudinal edge 200a and a second longitudinal edge 200b adhered to the inner wall of the conduit 100. This forms three channels 310, 320, 330 for the placement of cables or elongated structures. While FIG. 2 is shown with two strip-shaped substrates 200, there may be embodiments having three or more strip-shaped substrates 200.

FIG. 3 illustrates an additional embodiment of the invention where the divided conduit 10 contains a conduit 100 with one strip-shaped substrate 200, having a first longitudinal edge 200a and a second longitudinal edge 200b adhered to the inner wall of the conduit 100 as well as an additional point 200c of the material (between the first edge 200a and the second edge 200b) optionally adhered to the inner wall of the conduit 100. The additional point 200c runs along the longitudinal axis of the fabric. The conduit 100 having one strip-shaped substrate 200 forms a divided conduit having three channels 310, 320, 330.

One process for forming the divided conduit begins with an already formed, free-standing, strip-shaped substrate 200. This already formed strip-shaped substrate 200 is then introduced to the conduit extrusion process where the first and second edges 200a, 200b of the strip-shaped substrate 200 are adhered to or embedded into the polymeric material forming the wall or inner surface of the conduit 100 during the extrusion of the conduit or directly after the extrusion. In some embodiments, this step occurs when the strip-shaped substrate 200 is slightly below, slightly above, or at its glass transition temperature $T_g$. In this embodiment, the materials of strip-shaped substrate 200 (yarns for a textile or polymer for a film) preferably have a higher melting temperature than the polymer forming the conduit. In the case where the materials of the strip-shaped substrate 200 do not have a melting temperature, preferably strip-shaped substrate must be able to withstand the conduit forming (extrusion processing) conditions without a significant loss in physical properties.

In one exemplary method of the extrusion process where the conduit is formed, the strip-shaped substrate 200 is introduced into the forming conduit while the conduit is still at least partially molten and pressed into the surface of the molten conduit with, for example, a roller or a flexible rib. This allows the edges of the strip-shaped substrate 200 to be adhered or embedded into the material of the conduit. Multiple strip-shaped substrates can be introduced into the forming conduit resulting in multiple channels such as shown in FIGS. 2 and 5.

FIGS. 6-9 illustrate an exemplary embodiment of an extrusion die apparatus including an extrusion die 1700 having an extrusion pin 1000 received into die 1700. FIG. 6A is a top view of the extrusion die 1700 and FIG. 6B is a side view of the extrusion die 1700. The pin 1000 is a part of extrusion die 1700 as shown in the figures. However, as will be understood using the teachings disclosed herein, extrusion die 1700 is not limited to a pin construction to provide features of the invention and e.g., extrusion die 1700 may be constructed from e.g., stacked plates configured to provide the desired cross-sections along the flow path of the die that will now be described.

As shown, the extrusion die 1700 includes a first point 1501 for the introduction into the extrusion die 1700 of the polymeric material 1511 forming the conduit. An exit 1503 is provided for the outflow or removal of polymeric material 1511 from extrusion die 1700. While it is shown in the figures that there is only one extrusion point (first point 1501), there may be additional extrusion points within the extrusion die system depending on the end product. Also, while the entry areas for molten polymers are called points, this is not to imply that the polymer or polymeric material is introduced in a single point as the polymer is typically added around the entire circumference of the pin at this "point". In other embodiments, there may be additional points in the die 1700 where a polymeric material such as a molten polymer is introduced.

The polymeric material moves through die 1700 along an overall flow direction F in a flow path created by extrusion die 1700 as shown in FIG. 6A and FIG. 6B. A slot 1100 is configured for receipt of a strip-shaped substrate 1110 and extends in the flow direction F along pin 1000. During operation of die 1700, the slot is fed with the strip-shaped substrate 1110 as the polymeric material 1511 is extruded. As shown, for this exemplary embodiment, along flow direction F the slot 1100 begins upstream of first point 1501 where polymeric material 1511 is introduced.

FIGS. 7-9 are cross-section illustrations of the exemplary extrusion die apparatus of FIGS. 6A and 6B. FIG. 7 illustrates a cross-section taken of the extrusion die 1700 along the flow path at the A-A line. The A-A line is before the first point 1501 so there is not a layer of polymeric material 1511 appearing in this view. The slot 1100 with the strip-shaped substrate 1110 inside of it may be seen as well as the optional pull tape slots 1200 and the pull tapes 1210. A small pipe or channel can be extended from the end face 1509 (FIG. 6) of pin 1000 to prevent the pull tape 1210 from adhering to the polymeric material that may still be tacky when first exiting extrusion die 1700. Note that for the cross-section at A-A shown in FIG. 7, the slot 1100 is completely surrounded by pin 1000 and is not in communication with the polymeric material 1511 introduced at the first point 1501.

FIG. 8 illustrates a cross-section of the extrusion die 1700 taken along line B-B. Line B-B is after the first point 1501 so that the polymeric material 1511 that will form the conduit now appears. As shown in FIG. 8, the polymeric material 1511 does not form a continuous circle. Instead, the polymeric material 1511 is split into at least two opposing portions—a first opposing portion 1511*a* and a second opposing portion 1511*b*. The opposing portions 1511*a* and 1511*b* will eventually form a layer of polymeric material 1511 around pin 1000 in order to create the conduit. From line B-B, the polymeric material 1511 will continue to move along flow direction F towards the exit 1503 of the extrusion die 1700.

The two portions 1511*a* and 1511*b* each terminate at a pair of distal edges 1514*a* and 1514*b*, respectively. As compared to cross-section AA in FIG. 7, in FIG. 8 the slot 1100 of the strip-shaped substrate 1110 is now positioned between opposing portions 1511*a* and 1511*b* and is adjacent to their respective distal edges 1514*a* and 1514*b*. Thus, referring back to FIGS. 6A and 6B, slot 1100 has at least two sections along flow direction F: an upstream section 1507 where the slot 1100 is positioned outside of the distal edges 1514*a* and 1514*b*, and a downstream section 1508 where the slot 1100 is positioned between the two opposing portions 1511*a* and 1511*b* and adjacent to distal edges 1514*a* and 1514*b*. Referring back to FIG. 8, at cross-section B-B, the strip-shaped substrate 1110 and slot 1100 are still surrounded by the extrusion pin 1000 such that the substrate 1110 is not yet in contact with (i.e., still separated from) the polymeric material 1511.

Still referring to FIG. 8, for this exemplary embodiment the distal edges 1514*b* of the second opposing portion 1511*b* of polymeric material each include a joining element in the form of a pair of fingers 1520. It should be understood that in other embodiments of the invention, no joining features are provided at distal edges 1514*a* and 1514*b*. As shown, at each distal edge 1514*b*, the pair of fingers 1520 diverge as they extend towards the distal edge 1514*a* of the first opposing portion 1511*a*. As such, the diverging fingers 1520 create a Y-shaped appearance. It should be understood, however, that other configurations—including non-diverging—may be used for fingers 1520 as well.

The slot 1100 for the strip-shaped substrate 1110 includes a pair of lips 1521 positioned in an opposing manner along the sides of the slot 1100. Each lip 1521 extends toward a pair of diverging fingers 1520 on one of the distal edges 1514*b*. As such, each lip 1521 is configured to orient a longitudinal edge 1110*a* or 1110*b*, respectively, of the strip-shaped substrate 1110 into one of the pair of diverging fingers 1520 on each of the distal edges 1514*b* of the second opposing portion 1511*b*.

Although shown only on second opposing portion 1511*b*, using the teachings disclosed herein, one of skill in the art will understand that joining elements such as fingers 1520 could alternatively be placed on the distal edges 1514*a* of the first opposing portion 1511*a*. Lips 1521 would be reoriented accordingly. In still another exemplary embodiment, first opposing portion 1511*a* could be equipped with a pair of fingers 1520 along only one of its distal edges 1514*a* while second opposing portion 1511*b* could be equipped with a pair of fingers along only one of its distal edges 1514*b* in a complementary manner.

FIG. 9 illustrates a cross-section taken of the extrusion die 1700 along the flow path at the C-C line. Line C-C is at a point along the flow direction that is downstream of first point 1501 and second point 1502 but upstream of exit 1503. At this point, the two opposing portions 1511*a* and 1511*b* formed by the extrusion apparatus have been joined along the pair of distal edges 1514*a* and 1514*b* with the longitudinal edges 1110*a* and 1110*b* of the strip-shaped substrate 1110 embedded therebetween. Also, the two opposing portions 1511*a* and 1511*b* now form a first layer of polymeric material 1511 forming the conduit divided by substrate 1110. A second layer of polymeric material may also be optionally added to the outside of the first layer of polymeric material 1511.

In another exemplary aspect of the present invention, extrusion die 1700 and pin 1000 of FIGS. 6A and 6B and be configured to operate with a strip 1110 and polymeric portions 1511*a* and 1511*b* having different shapes and configurations than shown in FIGS. 7, 8, and 9 to form still additional embodiments of the divided conduit of the present invention. For example, FIGS. 10, 11, and 12 provide alternatively configured cross-sections of extrusion die 1700 and pin 1000 as will now be further described.

FIG. 10 illustrates a cross-section taken of the extrusion die 1700 at the A-A line. The A-A line is before the first point 1501 so there is not a layer of polymeric material appearing in this view. The slot 1100 with the strip-shaped substrate 1110 inside of it may be seen as well as the optional pull tape slots 1200 and the pull tapes 1210. Note that for the cross-section at A-A shown in FIG. 10, the slot 1100 is completely surrounded by the pin 1000 and is not in communication with the polymeric material 1511 introduced at the first point 1501.

FIG. 11 illustrates a cross-section of the extrusion die 1700 taken along line B-B. Line B-B is after the first point 1501 so that the polymeric material 1511 that will form the conduit now appears. As shown in FIG. 11, the polymeric material 1511 does not form a continuous circle. Instead, the polymeric material 1511 is split into at least two opposing portions—a first opposing portion 1511*a* and a second opposing portion 1511*b*. The opposing portions 1511*a* and 1511*b* will eventually form a layer of polymeric material 1511 around pin 1000 in order to create the conduit. From line B-B, the polymeric material 1511 will continue to move along flow direction F towards the exit 1503 of the extrusion die 1700.

The two portions 1511*a* and 1511*b* each terminate at a pair of distal edges 1514*a* and 1514*b*, respectively. As compared to cross-section AA in FIG. 10, in FIG. 11 the slot 1100 of the strip-shaped substrate 1110 is now positioned between opposing portions 1511*a* and 1511*b* and is adjacent to their respective distal edges 1514*a* and 1514*b*. Thus, referring back to FIGS. 6A and 6B, in this exemplary embodiment slot 1100 also has at least two sections along flow direction F: an upstream section 1507 where the slot 1100 is positioned outside of the distal edges 1514*a* and 1514*b*, and a downstream section 1508 where the slot 1100 is positioned between the two opposing portions 1511*a* and 1511*b* and adjacent to distal edges 1514*a* and 1514*b*. Referring back to FIG. 11, at cross-section B-B, the strip-shaped substrate 1110 and slot 1100 are still surrounded by the extrusion pin 1000 such that the substrate 1110 is not yet in contact with (i.e., still separated from) the polymeric material 1511.

Still referring to FIG. 11, for this exemplary embodiment the distal edges 1514*a* and 1514*b* of the opposing portions 1511*a* and 1511*b* of polymeric material 1511 each include a joining element. More specifically, the pair of distal edges 1514*a* of the first opposing portion 1511*a* includes a first pair of tabs 1522. The first pair of tabs 1522 extend inwardly towards each other as shown. Similarly, the pair of distal edges 1514*b* of the second opposing portion 1511*b* includes a second pair of tabs 1523 that also extend inwardly towards each other.

For this exemplary embodiment, all distal edges 1514*a* and 1514*b* are configured with tabs. In other exemplary embodiments, only one of the opposing portions 1511*a* or 1511*b* may be equipped with tabs. Alternatively, in still other embodiments, only one distal edge 1514 of each portion 1511a and 1511b may be equipped with a tab.

FIG. 12 illustrates a cross-section taken of the extrusion die 1700 at the C-C line. Line C-C is at a point along the flow direction that is downstream of first point 1501 and second point 1502 but upstream of exit 1503. At this point, the two opposing portions 1511a and 1511b formed by the extrusion apparatus have been joined along the pair of distal edges 1514a and 1514b with the longitudinal edges 1110a and 1110b of the strip-shaped substrate 1110 embedded therebetween. Also, the two opposing portions 1511a and 1511b now form a layer of polymeric material 1511 forming the conduit divided by substrate 1110. A second layer of polymeric material may also be optionally added to the outside of the first layer of polymeric material 1511.

In still another exemplary aspect of the present invention, extrusion die 1700 and pin 1000 of FIGS. 6A and 6B and be configured to operate with a strip 1110 and polymeric portions 1511a and 1511b having different shapes and configurations than shown in FIGS. 7-9 or FIGS. 10-12 to form still additional embodiments of the divided conduit. For example, FIGS. 13, 14, and 15 provide alternatively configured cross-sections of extrusion die 1700 and pin 1000 as will now be further described.

FIG. 13 illustrates a cross-section taken of the extrusion die 1700 at the A-A line. The A-A line is before the first point 1501 so there is not a layer of polymeric material appearing in this view. The slot 1100 with the strip-shaped substrate 1110 inside of it may be seen as well as the optional pull tape slots 1200 and the pull tapes 1210. As with previous embodiments, for the cross-section at A-A shown in FIG. 13, the slot 1100 is completely surrounded by the pin 1000 and is not in communication with the polymeric material 1511 introduced at the first point 1501.

FIG. 14 illustrates a cross-section of the extrusion die 1700 taken along line B-B. Line B-B is after the first point 1501 so that the polymeric material 1511 that will form the conduit now appears. As shown in FIG. 14, the polymeric material 1511 does not form a continuous circle. Instead, the polymeric material 1511 is split into at least two opposing portions—a first opposing portion 1511a and a second opposing portion 1511b. The opposing portions 1511a and 1511b will eventually form a layer of polymeric material 1511 around the pin 1000 in order to create the conduit. From line B-B, the polymeric material 1511 will continue to move along flow direction F towards the exit 1503 of the extrusion die 1700.

The two portions 1511a and 1511b each terminate at a pair of distal edges 1514a and 1514b, respectively. As compared to cross-section AA in FIG. 13, in FIG. 14 the slot 1100 of the strip-shaped substrate 1110 is now positioned between opposing portions 1511a and 1511b and is adjacent to their respective distal edges 1514a and 1514b. Thus, referring back to FIGS. 6A and 6B, slot 1100 has at least two sections along flow direction F: an upstream section 1507 where the slot 1100 is positioned outside of the distal edges 1514a and 1514b, and a downstream section 1508 where the slot 1100 is positioned between the two opposing portions 1511a and 1511b and adjacent to distal edges 1514a and 1514b. Referring back to FIG. 14, at cross-section B-B, the strip-shaped substrate 1110 and slot 1100 are still surrounded by the extrusion pin 1000 such that the substrate 1110 is not yet in contact with (i.e., still separated from) the polymeric material 1511.

Still referring to FIG. 14, for this exemplary embodiment the pair of distal edges 1514a of the first opposing portion 1511a includes a first pair of flanges 1524. Each flange 1524 creates a first notch 1525. For this exemplary embodiment, the pair of first notches 1525 face inwardly towards each other. Similarly, the pair of distal edges 1514b of the second opposing portion 1511b includes a second pair of flanges 1526. Each flange 1526 creates a second notch 1527. For this exemplary embodiment, the pair of second notches 1527 face outwardly and away from each other.

The slot 1100 for strip-shaped substrate 1110 includes a pair of lips 1528 positioned in an opposing manner along the sides of the slot 1100. Each lip 1528 extends within one of the second notches 1527. As such, each lip 1528 is configured to orient a longitudinal edge 1110a or 1110b, respectively, of the strip-shaped substrate 1110 into one of the second notches 1527 of the second opposing portion 1511b.

FIG. 15 illustrates a cross-section taken of the extrusion die 1700 at the C-C line. Line C-C is at a point along the flow direction that is downstream of first point 1501 and second point 1502 but upstream of exit 1503. At this point, the two opposing portions 1511a and 1511b formed by the extrusion apparatus have been joined along the pair of distal edges 1514a and 1514b with the longitudinal edges 1110a and 1110b of the strip-shaped substrate 1110 embedded therebetween. Also, the two opposing portions 1511a and 1511b now form a first layer of polymeric material 1511 forming the conduit divided by substrate 1110. A second layer of polymeric material may also be optionally added to the outside of the first layer of polymeric material 1511. It should be understood that while the extrusion die 1700 can add another layer of polymeric material onto the outside of layer 1511, the resulting conduit can appear as one, homogeneous material along a cross-section view even after the additional layer is added.

The thickness of slot 1100 relative to the thickness of the strip-shaped substrate 1110 can vary in certain embodiments of the invention. For example, in one exemplary embodiment, slot 1100 has a thickness that is about equal to or less than twice the average thickness of the strip-shaped substrate 1110. In another embodiment, the slot 1100 has a thickness that is about equal to or less than 1.5 times the average thickness of strip-shaped substrate 1110. In still another embodiment, the slot 1100 has a thickness that is about equal to or less than 1.25 times the average thickness of strip-shaped substrate 1110.

It should also be understood that relatively high pressures are used in extrusion die 1700 to cause the polymeric material to travel in the flow direction along the flow path of the die. The location, relative to the exit 1503, at which the strip-shaped substrate 1110 is first exposed to the extruded polymeric material 1511 can affect proper formation of the conduit with the substrate 1110 properly connected thereto. In one exemplary embodiment, the point at which substrate 1110 is exposed to the molten polymeric material is between about ½ inches to about ¾ inches upstream of exit 1503. In another exemplary embodiment, the point at which substrate 1110 is exposed to the molten polymeric material is between about ⅜ inches to about 1¼ inches upstream of exit 1503. In still another exemplary embodiment, the point at which substrate 1110 is exposed to the molten polymeric material is between about ¼ inches to about 1¾ inches upstream of exit 1503.

As will be understood by one of skill in the art using the teachings disclosed herein, the extrusion die of the present invention is not limited to the extrusion die 1700 having a pin 1000 received therein to create paths through which the polymeric material is extruded. Such a construction has been provided by way of example only. Thus, in addition to pin configurations described above, the extrusion die of the present invention can also be constructed from die plates that are each machined so that each forms a segment of the die and, therefore, part of the flow path for the extruded polymeric material. These individual die plates are then stacked or aligned together to form the overall die with a flow path having cross-sections as described, for example, in the exemplary embodiments and figures set forth above. By way of example, slots for the strip-shaped substrate and, optionally, the pull tapes can be machined into each plate. Each die plate can be machined to create the desired shape for the extruded polymeric material. Other constructions for the extrusion die may be used as well.

In one embodiment, there are two strip-shaped substrates introduced during the extrusion process to form a conduit having 3 channels 310, 320, and 330 such as shown in FIG. 2. In another embodiment, the strip-shaped substrate 200 is inserted into the extrusion process such that the two edges (first longitudinal edge 200*a* and second longitudinal edge 200*b*) are adhered to the inner wall of the conduit as well as another section of the strip-shaped substrate along its longitudinal axis. In this embodiment, shown in FIG. 3, the first longitudinal edge 200*a*, second longitudinal edge 200*b*, and an additional point 200*c* are adhered or embedded into the polymer of the conduit 100. With the one strip-shaped substrate 200, 3 channels 310, 320, and 330 are created.

The divided conduit may optionally contain pull lines or cords. These may be placed inside the conduit in at least one channel during manufacture of the divided conduit, after conduit formation, or after conduit placement. Pull lines, which are typically tightly woven, relatively flat strips of material, may be used for pulling cables through the channels. However, pull cords having a substantially round cross-section may be used successfully with smaller diameter cables.

In one embodiment, the pull lines are formed of tightly woven, polyester material, which exhibits a tensile strength of between about 400 pounds and about 3,000 pounds. In an alternate embodiment, a twisted round rope (for example, a multi-ply cord) may be used, where such pull cords are made of polypropylene, polyester, and the like.

The divided conduit is designed to contain cables or other elongated objects. These may be placed inside the conduit in at least one channel during manufacture of the divided conduit, after conduit formation, or after conduit placement.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of using an extrusion die to extrude conduit that is divided into channels by at least one strip-shaped substrate embedded into the conduit, the method comprising the steps in order:
    feeding a strip-shaped substrate through a slot within the extrusion die, wherein the strip-shaped substrate comprises a pair of longitudinal edges;
    introducing a first polymeric material into the extrusion die at a first point and causing the polymeric material to move along a flow direction of the extrusion die towards an exit of the extrusion die forming the polymeric material into two opposing portions, where each of the two opposing portions has a pair of distal edges, wherein the distal edges of one opposing portion each comprise a pair of diverging fingers extending towards one of the distal edges of an opposing portion, wherein the longitudinal edges of the strip-shaped substrate are positioned between the diverging fingers, wherein the strip-shaped substrate and the polymeric material are separated from each other at the first point; and,
    bringing the opposing portions of polymeric material in contact forming a first polymer layer such that the distal edges of polymeric material contact, adhere, and sandwich the strip-shaped substrate, and wherein the strip-shaped substrate is embedded into the first polymer layer.

2. The method of using an extrusion die to extrude conduit as in claim 1, wherein the step of bringing the opposing portions of polymeric material in contact forming a first polymer layer occurs along the flow direction at a point downstream of the first point and upstream of the exit of the extrusion die.

3. The method of using an extrusion die to extrude conduit as in claim 1, the method further comprising the steps of:
    introducing a second polymeric material in the die at a second point and causing the polymeric material to move along the flow direction of the extrusion die towards an exit of the extrusion die, wherein the second point is located along the flow direction downstream of the first point and upstream of the exit to the extrusion die; and
    forming a second layer of polymeric material around the first layer of polymeric material of the conduit.

4. The method of using an extrusion die to extrude conduit as in claim 1, further comprising the step of feeding a pull tape through the extrusion die.

5. A method of using an extrusion die to extrude conduit that is divided into channels by at least one strip-shaped substrate embedded into the conduit, the method comprising the steps in order:
  feeding a strip-shaped substrate through a slot within the extrusion die, wherein the strip-shaped substrate comprises a pair of longitudinal edges;
  introducing a first polymeric material into the extrusion die at a first point and causing the polymeric material to move along a flow direction of the extrusion die towards an exit of the extrusion die forming the polymeric material into a first opposing portion and a second opposing portion, where each of the opposing portions has a pair of distal edges, wherein distal edges of the first opposing portion comprise a first pair of tabs, wherein the first pair of tabs extend inwardly and towards each other, wherein distal edges of the second opposing portion comprise a second pair of tabs, wherein the second pair of tabs extend inwardly and towards each other, wherein the longitudinal edges of the strip-shaped substrate are positioned between the tabs of the opposing portions, and wherein the strip-shaped substrate and the polymeric material are separated from each other at the first point; and,
  bringing the tabs of the opposing portions of polymeric material in contact forming a first polymer layer such that the tabs of the distal edges of polymeric material contact, adhere, and sandwich the strip-shaped substrate, and wherein the strip-shaped substrate is embedded into the first polymer layer.

6. The method of using an extrusion die to extrude conduit as in claim 5, the method further comprising the steps of:
  introducing a second polymeric material in the die at a second point and causing the polymeric material to move along the flow direction of the extrusion die towards an exit of the extrusion die, wherein the second point is located along the flow direction downstream of the first point and upstream of the exit to the extrusion die; and
  forming a second layer of polymeric material around the first layer of polymeric material of the conduit.

7. The method of using an extrusion die to extrude conduit as in claim 5, further comprising the step of feeding a pull tape through the extrusion die.

8. A method of using an extrusion die to extrude conduit that is divided into channels by at least one strip-shaped substrate embedded into the conduit, the method comprising the steps in order:
  feeding a strip-shaped substrate through a slot within the extrusion die, wherein the strip-shaped substrate comprises a pair of longitudinal edges;
  introducing a first polymeric material into the extrusion die at a first point and causing the polymeric material to move along a flow direction of the extrusion die towards an exit of the extrusion die forming the polymeric material into a first opposing portion and a second opposing portion, where each of the opposing portions has a pair of distal edges, wherein distal edges of the first opposing portion comprise a first pair of flanges that define a first notch along each of the distal edges of the first opposing portion, wherein distal edges of the second opposing portion comprise a second pair of flanges that define a second notch along each of the distal edges of the second opposing portion, wherein the longitudinal edges of the strip-shaped substrate are positioned between the flanges of the opposing portions, wherein the strip-shaped substrate and the polymeric material are separated from each other at the first point; and,
  bringing the opposing portions of polymeric material in contact such that the first pair of flanges of the first opposing portion are received into the second notches of the second opposing portion and the second pair of flanges of the second opposing portion are received into the first notches of the first opposing portion forming a first polymer layer such that the distal edges of polymeric material contact, adhere, and sandwich the strip-shaped substrate, and wherein the strip-shaped substrate is embedded into the first polymer layer.

9. The method of using an extrusion die to extrude conduit as in claim 8, the method further comprising the steps of:
  introducing a second polymeric material in the die at a second point and causing the polymeric material to move along the flow direction of the extrusion die towards an exit of the extrusion die, wherein the second point is located along the flow direction downstream of the first point and upstream of the exit to the extrusion die; and
  forming a second layer of polymeric material around the first layer of polymeric material of the conduit.

10. The method of using an extrusion die to extrude conduit as in claim 8, further comprising the step of feeding a pull tape through the extrusion die.

* * * * *